H. BRAUTIGAM.
SURVEYING INSTRUMENT.
APPLICATION FILED FEB. 24, 1913.
1,125,053.
Patented Jan. 19, 1915.
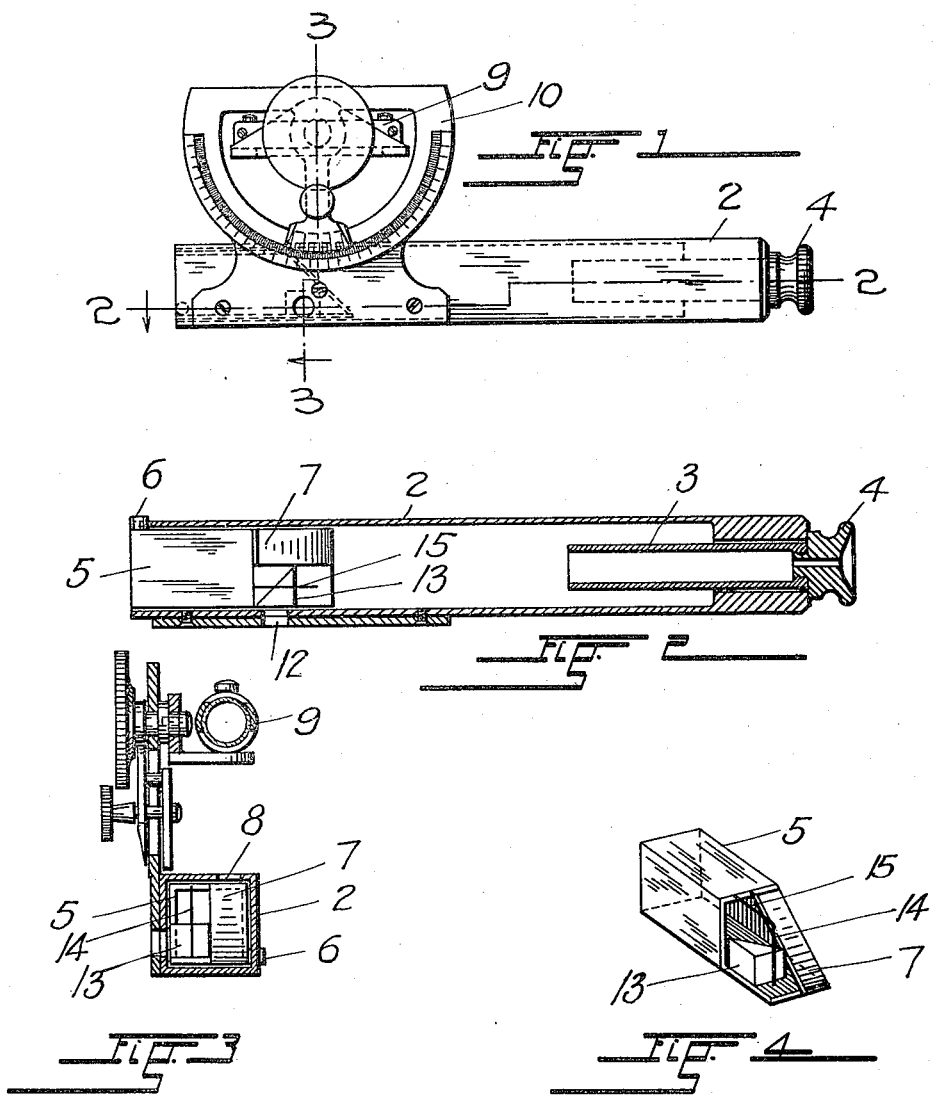

UNITED STATES PATENT OFFICE.

HENRY BRAUTIGAM, OF DENVER, COLORADO, ASSIGNOR OF ONE-HALF TO PAUL WEISS, OF DENVER, COLORADO.

SURVEYING INSTRUMENT.

1,125,053.  Specification of Letters Patent.  Patented Jan. 19, 1915.

Application filed February 24, 1913. Serial No. 750,248.

*To all whom it may concern:*

Be it known that I, HENRY BRAUTIGAM, a citizen of the United States, residing at Denver, in the county of Denver and State of Colorado, have invented certain new and useful Improvements in Surveying Instruments, of which the following is a specification.

This invention relates to improvements in surveying instruments of the type designed for the establishment of points at right angles with a predetermined line, and its object resides in the provision of a simple mechanism for accomplishing this purpose which may be embodied either in a separate instrument or in conjunction with a clinometer-level or an ordinary hand level.

An embodiment of my invention has been shown in the accompanying drawings in the various views of which like parts are similarly designated and in which, Figure 1 represents a side elevation of a clinometer-level to which my invention is applied, Fig. 2, a horizontal section taken along the line 2—2, Fig. 1, Fig. 3, a transverse section taken along the line 3—3, Fig. 1, and Fig. 4, a perspective view of the telescoping slide at the objective end of the instrument shown in Fig. 1.

The instrument to which my invention is applied consists of a sight tube 2 preferably of rectangular cross-section, which at one of its ends is provided with a telescoping tubular member 3 which carries the eye piece 4. An open-ended tube 5 which is slidingly fitted in the objective end of the sight tube 2 is held in place therein by means of a stop 6 which occupies a notch in the edge of the latter. The short-tube 5 is provided at its inner end with a reflector 7 which slants at an angle of forty-five degrees between its top and bottom surfaces immediately beneath an opening 8 in the upper side of the sight tube for the reflection of a bubble in a spirit level 9 which together with a graduated arc 10 upon which it is pivotally mounted, constitutes the clinometer element of the instrument.

The outer edge of the inclined reflector 7 extends adjacent one of the upright sides of the sight tube and its opposite edge is disposed in the vertical plane of the longitudinal axis of the same to take the place of the vertical cross wire which crosses the horizontal wire in the center of a transverse plane of the instrument.

The construction so far described is that of an ordinary clinometer level and to adapt the same for the purpose of the present invention, I first of all provide the sight tube at one of its sides with a secondary objective opening 12 and fasten upon the bottom surface of the sliding tube 5, a right-angled triangular prism 13, one side of which lies flat against the inner surface of the sight tube to close the opening 12, while its side at right angles to the first-mentioned side, extends transversely of the space between the said inner surface of the sight tube and the inner edge of the inclined reflector 7 to which it is contiguous.

The height of the prism is one-half of the vertical dimension of the interior of the sight tube so that its upper surface extending in the horizontal plane of the longitudinal axis of the same, takes the place of the horizontal cross wire which is ordinarily applied in instruments of this character at the objective end of the tube, and which in the present instrument is in consequence omitted.

Erected upon the bottom surface of the inner tube 5 between the prism and the eyepiece 4 is a vertical wire 14 which is held in an upright position on the said tube by means of an integral part 15 which is bent at right angles to its body portion and secured to the edge of the said tube, as is plainly shown in Fig. 4 of the drawings.

In using an instrument constructed in accordance with the foregoing description for the purpose of establishing a point at right angles to a given line, the operator standing at a point in said line places the sight tube to the eye and after having adjusted it to a substantially horizontal position by observing the reflection of the bubble in the spirit level 9 in the inclined reflector, brings another point of the said line in alinement with the point of intersection of the vertical cross wire 14 and the upper edge of the prism when the object reflected by the said prism through the objective opening 12, whose image is bisected by the same cross wire, will be the point it was desired to establish at right angles to the predetermined line.

When the instrument is used as a clinometer, the line of sight passes through the intersection of the edges of the reflector 7 and the prism 13 which as stated hereinbefore perform the function of the customary cross-hairs. If, however, the instrument is employed to establish a point at right angles to a given line, the operator sights at a point in said line, while holding the instrument so that its line of sight intersects the wire 14, when the object reflected by the prism through the opening 12, in intersection with the same wire, will establish the desired point at right angles to the given line. It follows that in order to make the instrument accurately correct, it would be necessary to place the prism in the tube so that its face which lies in the field, is at right angles to the line of sight passing through the opening in the eye-piece 4 and the cross-hair 14, but this deviation in the position of the prism is so slight, that for all ordinary uses, it can be placed as shown in the drawings at substantially right angles to the line of sight passing through the intersection of the edge of the reflector.

It will be observed that the application of my invention to the instrument interferes in no way with its ordinary use as a hand level or a clinometer level, that all the internal parts of the instrument are assembled on the sliding member which greatly facilitates their adjustment and positively insures their proper relative positions, and that the use of the upper surface of the prism as a substitute for the ordinary horizontal cross wire not only increases the accuracy of the instrument, but also lessens the cost of manufacture.

Having thus described my invention what I claim and desire to secure by Letters-Patent is:

1. In an instrument of the class described, a sight-tube having at its opposite ends, a sight opening and an objective opening and at one of its sides, a second objective opening, means in said tube for establishing a vertical cross line in the vertical plane of its longitudinal axis, a prism disposed opposite to the last-mentioned opening for the reflection of an object in alinement with the same, in a transverse plane of the said tube, a surface of the said prism lying in a plane of the longitudinal axis of the tube, to establish the horizontal cross-line, and a vertical cross-wire disposed to appear in the field of said prism.

2. In an instrument of the class described, a sight-tube having at its opposite ends, a sight-opening and an objective opening and, at one of its sides, a second objective opening, an inclined reflector having an edge in the vertical plane of the longitudinal axis of said tube to establish a vertical cross-line, a spirit level exteriorly of the tube, a prism disposed opposite said second objective opening for the reflection of an object alined with the same, in a transverse plane of said tube, said prism having a surface lying in the horizontal plane of the longitudinal axis of the sight tube to establish a horizontal cross-line, and a vertical cross-wire disposed to appear in the field of said prism, said sight tube having an opening between the said reflector and the said spirit-level.

3. In an instrument of the class described, a sight-tube having at its opposite ends, a sight-opening and an objective-opening and, at one of its sides, a second objective opening, an open-ended tube fitted in the objective end of the sight tube, an inclined reflector on said inner tube, having an edge in the vertical plane of the longitudinal axis of the sight-tube to establish a vertical cross-line, a spirit level exteriorly of the sight-tube, and a prism on said inner tube opposite the second objective opening for the reflection of an object alined with said opening, in a transverse plane of the sight-tube, said prism having a surface in the horizontal plane of the longitudinal axis of the sight tube to establish a horizontal cross-line, and the said sight-tube having an opening between said reflector and the said spirit-level.

4. In an instrument of the class described, a sight-tube having at its opposite ends, a sight-opening and an objective opening and at one of its sides, a second objective opening, an inclined reflector having an edge in the vertical plane of the longitudinal axis of said tube to establish a vertical cross-line, a spirit level exteriorly of the tube, and a prism disposed opposite said second objective opening for the reflection of an object alined with the same, in a transverse plane of said tube, said prism having a surface lying in the horizontal plane of the longitudinal axis of the sight tube to establish a horizontal cross-line, and said sight tube having an opening between the said reflector and the said spirit-level.

5. In an instrument of the class described, a sight-tube having at its opposite ends, a sight-opening and an objective opening and at one of its sides, a second objective opening, means in said tube for establishing a cross-line, and a prism disposed opposite to the last-mentioned opening for the reflection of an object in alinement with the same, in the field of the tube, an edge of the said prism lying in a plane of the line of sight of the tube to establish a second cross-line for coöperation with the first-mentioned cross line.

6. In an instrument of the class described, a sight tube having at its opposite ends, a sight-opening and an objective opening, and at one of its sides, a second objective opening, an inclined reflector having an edge in a plane of the line of sight of the tube to establish a cross-line, a spirit-level exteriorly of the sight-tube, and a prism disposed opposite to the last-mentioned opening for the reflection of an object in alinement with the same, in the field of the tube, an edge of said prism lying in a plane of the line of sight of the tube to establish a second cross-line at right angles to the first-mentioned cross-line, and the sight tube having an opening between the reflector and the said spirit level.

In testimony whereof I have affixed my signature in presence of two witnesses.

HENRY BRAUTIGAM.

Witnesses:
G. J. ROLLANDET,
F. H. CUNO.